Feb. 19, 1957　　　C. J. COCHRAN ET AL　　　2,781,534
WASHER FOR BENT LAMINATED GLASS
Filed June 24, 1952　　　　　　　　　　　　　　　4 Sheets-Sheet 1
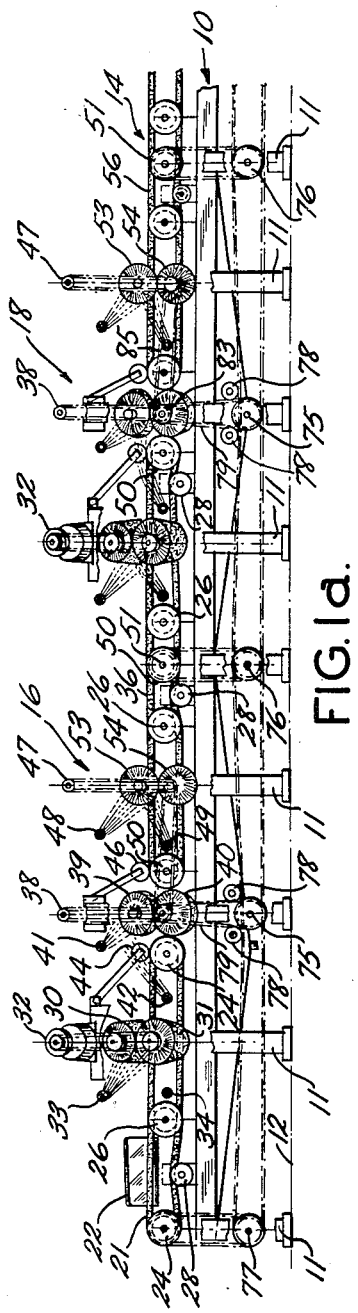
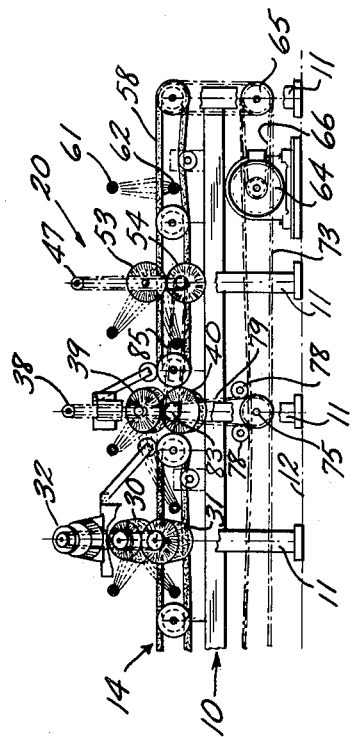
INVENTORS
Carl J. Cochran
Martin Neuhausen
BY
Emery Varney
Whittemore & Dix
ATTORNEYS Feb. 19, 1957  C. J. COCHRAN ET AL  2,781,534
WASHER FOR BENT LAMINATED GLASS
Filed June 24, 1952  4 Sheets-Sheet 2

INVENTORS
Carl J. Cochran
Martin Neuhausen
BY Emery, Varney,
Whittemore & Dix
ATTORNEYS.

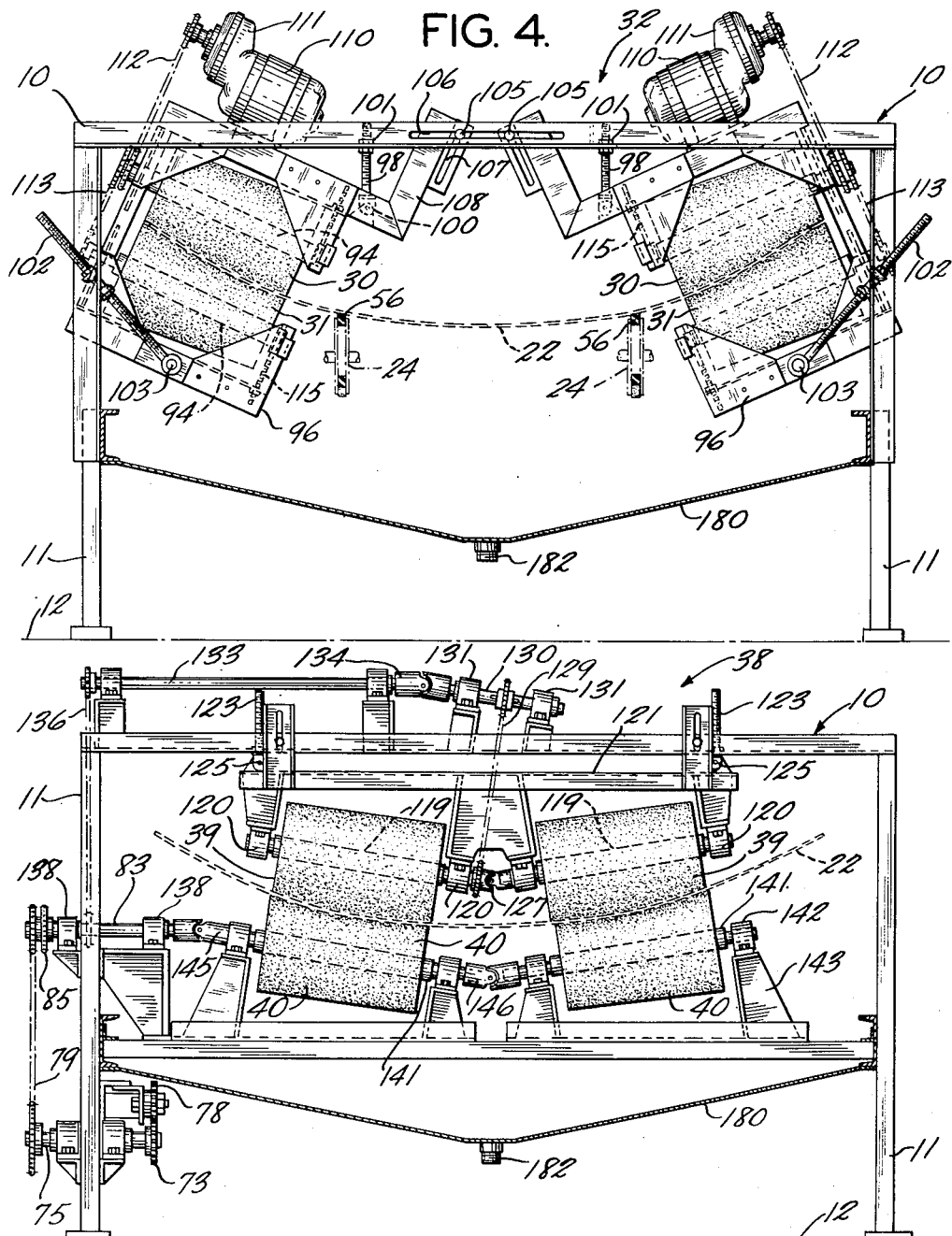

United States Patent Office 2,781,534
Patented Feb. 19, 1957

2,781,534

WASHER FOR BENT LAMINATED GLASS

Carl J. Cochran, New Kensington, and Martin W. Neuhausen, Zelienople, Pa., assignors to Pittsburgh Plate Glass Company Application June 24, 1952, Serial No. 295,214

16 Claims. (Cl. 15—77)

This invention relates to apparatus for washing articles having curved surfaces, particularly windshield laminations. The invention will be described as applied to apparatus for washing windshield laminations, but it will be understood that some features of the invention are applicable to other apparatus in which articles with curved surfaces can be washed while passing a number of like articles through the apparatus in succession as in factories having mass production.

In the manufacture of automobile windshields, separate glass sheets are put together to make the laminated shatter-proof glass. Before the laminating process, both faces of each glass sheet must be thoroughly washed and dried. This invention is directed to the apparatus that washes the glass.

In its broadest aspects, it is an object of this invention to provide improved apparatus for washing articles having curved surfaces, and for washing such articles as they are advanced through the apparatus on a conveyor past various groups of brushes and brush stands.

One feature of the invention relates to a construction in which the surfaces to be washed are subject to scrubbing by brushes located on opposite sides of a center region so that the forces applied to the articles are substantially balanced and no mechanism is required to hold the articles against displacement on the conveyor. Another feature relates to a construction in which the windshields, or other articles, are advanced along a conveyor made up of sections with gaps at regions where the articles are to be washed on those areas which rest on the conveyor as the articles move through the apparatus.

Another object of the invention is to provide apparatus for washing windshields, or other articles, successively across limited portions of their width, the higher portions being washed first so that water from the upper areas flows downwardly across the lower areas of the articles; and the devices that do the actual washing of the surfaces can be adjusted to accommodate windshields, or other articles of somewhat different curvature.

An important feature of the invention comprises rotary brushes of substantial width transverse of the direction of movement of the windshields or other work pieces through the apparatus, and these brushes are constructed so that they taper, that is, the diameter of the respective brushes becomes progressively less toward one end. However, the taper of the complementary brushes on opposite sides of the windshield are in opposite direction, and the gain in the diameter of one brush is substantially equal to the reduction of the diameter of the other brush. This gives a variety of linear speeds to the bristles of the different regions of the brushes and results in a more satisfactory washing action than with brushes that are of substantially uniform diameter throughout their width.

Other objects, features and advantages of the invention will appear or be pointed out as the description proceeds.

In the drawing, in which like reference characters indicate corresponding parts in all the views, Figures 1a and 1b are diagrammatic views showing a side elevation of washing apparatus embodying this invention.

Figure 2:
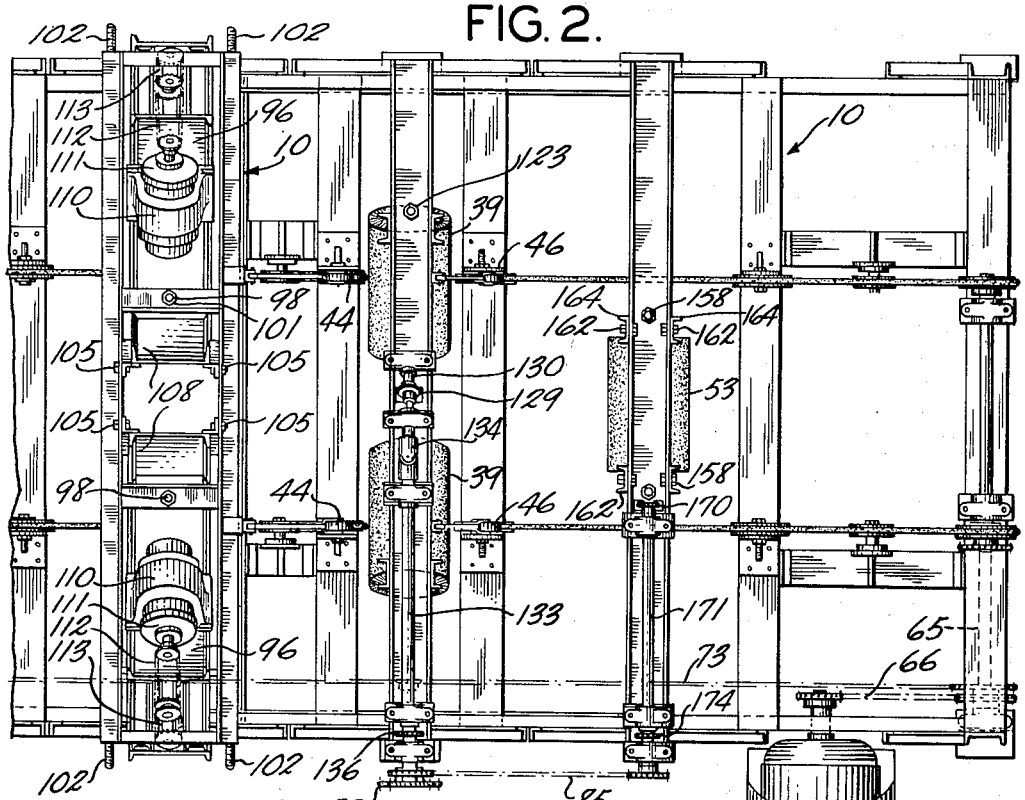
Figure 2 is an enlarged top plan view of a portion of the apparatus shown in Figure 1.
Figure 3:
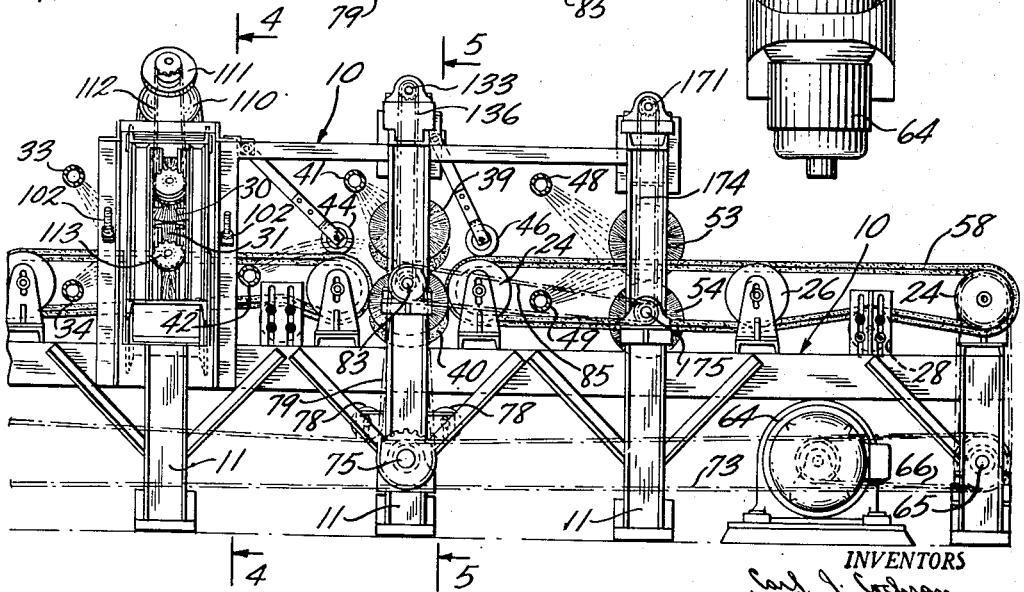
Figure 3 is a side elevation of the structure shown in Figure 2.
Figure 6:
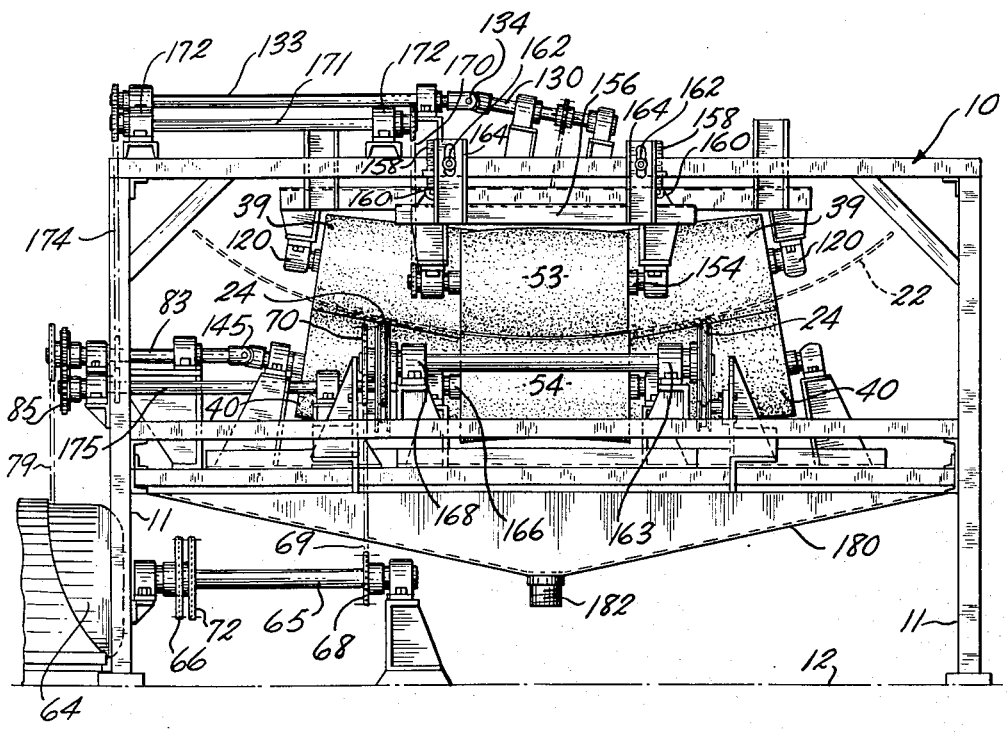

Figures 4 and 5 are sectional views taken on the lines 4—4 and 5—5 respectively of Figure 3, and Figure 6 is an end view of the apparatus shown in Figure 3, but without the first washing brush stand which would be in the remote background of the figure.

The washing apparatus comprises a machine having a main frame 10, of substantial length, supported at spaced regions by legs 11 which rest upon a floor 12 of the factory or other location at which the apparatus is located. The frame 10 supports a conveyor 14 which is made up of four different sections in the construction illustrated.

There are three groups of stands, including a group 16 with three stands of brushes; a similar group 18 located further along the conveyor from the first group 16; and a third similar group 20 beyond the intermediate group 18 and near the delivery end of the conveyor. Since these different groups of brushes are of similar construction, only one will be described in detail.

The conveyor 14 has a first section 21 which is shown with a windshield 22 resting on it. This first section of the conveyor is relatively short and has belts that pass around pulleys 24 at opposite ends of the conveyor section. These belts are parallel and the windshield 22 is placed across them to be supported with only a small area of its bottom surface covered by the conveyor belts. The conveyor section 21 has an intermediate roller 26 under each belt, and has an adjustable roller 28 for tightening each of the conveyor belts.

As the windshield 22 travels along the conveyor 14, each of the outer edge portions, or wings of the windshield 22 pass between upper and lower rotary brushes 30 and 31, respectively, of a first brush stand 32.

An upper spray pipe 33 extends across the full width of the windshield 22 and has jet outlets in position to spray the top surfaces of the wing portions of the windshield. A lower spray pipe 34 is located below the top run of the conveyor section 21 and has jet outlets in position to spray the underside of the windshield over the areas with which the brushes 31 come into contact.

Beyond the discharge end of the conveyor section 21 there is a short gap before the beginning of a second conveyor section 36. Within this gap there is another brush stand 38 with upper and lower brushes 39 and 40 that contact with the areas of the windshield 22 inward from the outer or wing portions which were washed by the brushes of the first brush stand 32. The brushes of this second brush stand 38 contact with the areas of the windshield surfaces which rest upon the conveyor belt and there are upper and lower spray pipes 41 and 42 in position to discharge washing liquid against the upper and lower surfaces, respectively, of the windshield over those areas with which the brushes 39 and 40 come into contact.

In order to ensure passage of each windshield across the gap between the first and second conveyor sections, without having the windshield shift out of place on the conveyor, there is an upper roller 44 which holds the windshield against the conveyor beneath it until the full length of the windshield reaches the end of the first section of the conveyor, and there is a similar roller 46 for pressing the windshields into contact with the second section 36 of the conveyor from the time that the front edge of the windshield first comes onto this second section of the conveyor.

Near the upstream end of the second section 36 of the conveyor, there is another brush stand 47 with brushes that scrub the center section of each windshield 22. There are upper and lower spray pipes 48 and 49, respectively, just ahead of the brush stand 47 for spraying washing liquid against the surface areas with which the brushes of the brush stand 47 contact. The brushes of this third brush stand are indicated by the reference characters 53 and 54. In the preferred operation of the washing apparatus, all of the spray pipes 33, 34, 41, 42, 48 and 49, for the first group of brush stands, supply a mixture of water and a cleaning material, such as powdered pumice, for scouring the upper and lower surfaces of the glass, throughout the entire area of the glass, as successive windshields pass between the brushes of this first group 16.

The second conveyor section 36 has pulleys 50 at opposite ends of its belts, there being pulleys on the same shaft 51 at the middle of the section 36 for successive belts of this section of the conveyor. There are intermediate rollers 26 providing support for the upper runs of the conveyor belts of the second conveyor section 36, and the tension of these conveyor belts is adjustable by moving adjustable tensioning rollers 28 upward or downward to increase or decrease the tension of the conveyor belts.

The brush stands and brushes of the second group 18 are the same as those of the first group 16, already described; and corresponding brush stands and the elements thereof, in the group 18 and also of the group 20, are indicated by the same reference characters as in the brush stand group 16. There are upper and lower spray pipes for the second group 18 of brush stands, also similar to the construction for the first group 17; but in the preferred operation of the apparatus, clear water without scouring powder or other additions is supplied to all of the spray pipes of the second group of brush stands.

The successive windshields are carried through the last brush stand, of the group 18, by a third conveyor section 56 which is similar in construction to the conveyor section 36. This third conveyor section 56 carries the windshield to the third group 20 of brush stands, which is similar to the other groups 16 and 18, and the spray pipes for this third group of brush stands are preferably supplied with clear water only, to rinse the surfaces of the windshields. The last section 58 of the conveyor is similar to the first section 21, but turned in the opposite direction, and there is a final pair of spray pipes 61 and 62 which project clear water against the upper and lower surfaces of the windshields across their entire width before the windshields are discharged from the last conveyor section of the washing apparatus, ready for delivery to a drying region.

Most of the driven elements of the conveyor are operated from a single motor 64. This motor drives a shaft 65 through a chain-and-sprocket connection 66. Although chains provide a more positive drive, belts, and particularly V-belts, are to be considered a mechanical equivalent in the driving mechanism of this invention.

There is a sprocket 68 (Figure 6), secured to the drive shaft 65 with a chain 69 leading to a sprocket 70 on the same shaft with the end pulleys 24 of the last section of the conveyor. The shaft 65 also supplies power for driving the other sections of the conveyor, and for driving most of the brushes of the washing apparatus. This power is supplied by a sprocket 72 which drives a long chain 73, best shown in Figures 1a and 1b. The chain 73 extends throughout the length of the machine and drives shafts 75, 76 and 77. There are tensioning rollers 78 at spaced regions along the length of the chain 73.

There is a shaft 75 for each of the middle brush stands 38 and it has a chain-and-sprocket connection 79 with an axle 83 of the lower brush 40. The upper brush 39 of each middle brush stand 38 is driven by a chain-and-sprocket connection with the lower brush by a construction which will be described more fully in connection with one of the sectional views.

The brushes of the last brush stand 47 of each brush stand group are driven from the axle 83 through a chain-and-sprocket connection 85.

The shafts 76 have chain-and-sprocket connections to the driven shaft 51 to which the driving pulleys for the conveyor section 56 are secured. The shaft 77 at the supply-end of the machine corresponds to the shaft 65 at the delivery end of the machine.

Figure 4 shows the construction of one of the first brush stands 32. Each pair of brushes includes the upper brush 30 and the lower brush 31, and each pair of brushes of these first brush stands in each group is driven by a separate motor. The brushes 30 and 31 have axles 94 which rotate in bearings in a frame 96.

Each brush-supporting frame 96 is supported from the main frame 10 of the apparatus by connections which are adjustable over a considerable range to accommodate the brushes to windshields 22 having different curvature and different variations in curvature. The brushes 30 and 31 contact with the outer end portions or wings of the windshield 22 and it may be necessary to adjust these brushes for greater or lesser inclination than that shown.

The frame 96 is supported from the main frame 10 by a bolt or screw 98, which extends upwardly through the main frame 10. At the lower end of this screw 98 there is a yoke connected to the frame 96 by a pivot 100. The inner end of the frame 96 is raised or lowered by adjusting nuts 101 that are threaded on the screw 98 on top of the element of the frame 10 through which the screw 98 extends. There is a clamping nut on the screw 98 under this frame element.

The outer end of the frame 96 is held in position by eye-bolts 102 which pass through a portion of the frame 10 and each of which is connected to the brush frame 96 by a pivot 103. In order to give greater rigidity to the frame 96, after its position is adjusted, it is provided with clamping bolts 105 which extend through slots 106, in the frame 10 and through another slot 107 in extensions 108 of the frame 96 within the transverse portion of the main frame from which the brush-supporting frame hangs.

When the clamping bolts 105 are loosened, they do not interfere with the adjustment of the brush-supporting frame 96 because these bolts are free to move along the intersecting slots 106 and 107. After the proper adjustment of the frame 96 has been obtained, the clamping bolts 105 are tightened.

The upper brush 30 is driven by a motor 110 through reduction gearing 111 and a chain-and-sprocket connection 112. The lower brush 31 is driven from the axle 94 of the upper brush through a chain-and-sprocket connection 113. The motor 110 is rigidly secured to the brush-supporting frame 96 so that all of the driving connections to the brushes 30 and 31 move as a unit with the frame 96 when the frame is adjusted.

The brushes 30 and 31 on both sides of the machine are the same except that they are in reverse positions to accommodate them to the right and left-hand sides of the machine.

The upper brushes 30 are tapered so that they increase in diameter toward their inner ends. The lower brushes 31 have a reverse taper, that is, they decrease in diameter toward their inner ends.

These tapers, though opposite, are preferably equal so that they offset one another and leave the brushes in contact across their full widths. It is not necessary to have the brushes 30 and 31 curved to fit the windshield 22 because the bristles of the brushes are long enough and flexible enough to accommodate themselves to the curve of the windshield. Since the rotary speed of all portions of both brushes 30 and 31 is the same, and since their diameters at different regions are different because of their taper, it will be evident that the bristles move across the surfaces of the windshields at different speeds. This produces a better scrubbing action of the brushes on the surfaces of the glass.

The axles 94 of the brushes 30 and 31 are adjustable at their inner ends by means of screws 115 to control the parallelism of the axles 94, the bearings at the other ends of the axles being constructed for limited tilting movement.

Figure 5 shows the construction of one of the second brush stands. The upper brushes 39 have axles 119 which turn in bearings 120 supported from an adjustable frame 121 hanging from the main frame 10 by screws 123. These screws extend through the main frame and have yokes at their lower ends connected to the adjustable frame 121 by pivots 125. The screws 123 have nuts threaded on them which are adjustable to raise and lower the frame 121 and the brushes 39 carried by the frame.

The axles 119 are in angular relation to one another and are connected together at their inner ends by a universal joint 127. Power is supplied to the left-hand axle 119 through a chain-and-sprocket connection 129 to a shaft 130 supported by bearings 131 on the main frame 10 in a position parallel to the axle 119 of the left hand brush 39. The shaft 130 is driven from another shaft 133 through a universal joint 134; and this shaft 133 receives its power from the jack shaft 83 through the chain-and-sprocket connection 136.

The jack shaft 83 turns in bearings 138 mounted on the main frame 10. This shaft 83 drives the lower brushes 40 which have axles 141 substantially parallel to the axles 119 of the upper brushes 39. The axles 141 turn in bearings 142 rigidly connected to the main frame 10 by brackets 143. The left-hand axle 141 is connected with the shaft 83 by a universal joint 145; and the axles 141 are connected with each other by a universal joint 146.

The brushes of the brush stand illustrated in Figure 5 are tapered, like the brushes already described in Figure 4, with the taper of the upper and lower brushes of each pair in the opposite direction. Power to rotate the lower brushes 40 is supplied to the jack shaft 83 through the chain-and-sprocket drive 79 from the shaft 75. This shaft 75 is driven by the long chain 73, as described in connection with Figure 1b.

The brushes 40 wash the bottom face of the windshield 22 over the area that rests on the conveyor. These brushes are, therefore, located in a gap between sections of the conveyor, as previously explained, and this is why the conveyor does not appear in Figure 5.

Figure 6 is an end view of the apparatus and shows the third bush stand 47 of the last group of brushes. This brush stand includes an upper brush 53 and a lower brush 54. The upper brush 53 is convex across the full width of the brush, and the lower brush 54 has a complementary concave curvature. This curvature of the brushes is preferably similar to the curvature of the windshield 22, but the bristles of the brushes are long enough and flexible enough to accommodate windshields of different curvature throughout a reasonable range on both sides of the shape illustrated.

The upper brush 53 has an axle 154 which rotates in bearings rigidly secured to a frame 156 which hangs from the main frame 10 of the apparatus. The brush-supporting frame 156 is connected with the main frame of the apparatus by screws 158 attached to the frame 156 by pivots 160.

The frame 156 can be raised and lowered by adjusting nuts on the screws 158; and the frame 156 is rigidly held in any adjusted position by clamping bolts 162 extending through the main frame 10 and through slots in brackets 164 that project upwardly on both sides of the frame 156 and at both the forward and rearward faces of the transverse portion of the frame 10 from which the screws 158 hang.

The lower brush 54 has an axle 166 which rotates in bearings 168 rigidly connected with the main frame of the apparatus. The axle 154 of the upper brush 53 has a sprocket on one end and is driven by a chain-and-sprocket connection 170 from a power shaft 171 which turns in bearings 172 mounted on the main frame. This shaft 171 receives its power, through a chain-and-sprocket connection 174 with a lower shaft 175 which drives the axle 166 of the lower brush 54. Power is supplied to this lower shaft 175, through the chain-and-sprocket connection 85, from the jack shaft 83 of the preceding brush stand.

The water used in the washing of the windshield falls eventually into a pan 180 extending across the full width of the main frame 10 throughout substantially the entire length of the apparatus. There are drains 182 at various points along the length of the pan 180 for carrying away waste water from the pan.

The preferred embodiment of the invention has been illustrated and described, but changes and modifications can be made without departing from the invention as defined in the claims.

What is claimed is:

1. Apparatus for washing curved-surface articles, said apparatus comprising a conveyor supporting the articles and along which successive articles travel with different areas of the surface of the article at different levels transversely of the conveyor and with the lowest level of each article adjacent to the transverse middle of the article as the article travels along the conveyor, a plurality of brush-supporting axles at different locations lengthwise of the conveyor with axes of rotation extending transversely of the direction of movement of the conveyor, brushes on the axles, there being on the axles at at least one location a plurality of brushes transversely spaced from one another and the brushes at any location having a plurality of brushes being substantially symmetrical transversely of the center of support of the articles on the conveyor to avoid rotative forces tending to turn the articles on the conveyor, at least some of the brushes being at different levels and in position to contact the different-level areas of the surfaces of each successive article as it is advanced along the conveyor, successive brushes in the direction of travel of the conveyor being at progressively lower levels so that successive brushes contact with successive areas toward which washing fluid tends to flow on said articles, and conduits adjacent to the brushes for supplying water to the articles.

2. The apparatus for washing curved-surface articles as described in claim 1 and in which there are means for supplying cleaning material to the surfaces of the articles ahead of the brushes, and there are means for supplying rinsing water to conduits which are adjacent to but beyond the brushes in the direction of movement of the articles, and other brushes similar to said plurality of brushes and similarly disposed with respect to the conveyor at locations beyond the conduits that supply the rinsing water.

3. The washing apparatus described in claim 1 characterized by several groups of brushes and means that supply rinsing liquid to the articles at successive regions along the length of the conveyor beyond the first group of brushes.

4. Apparatus for washing bent sheets of glass or the like, said apparatus including a conveyor supporting the articles and along which the bent sheets are advanced with at least the major part of the curvature of each sheet around axes that extend in the direction of the path of travel of the bent sheets along the conveyor and with the lowest portion of each bent sheet at a transverse central region of the conveyor, a plurality of brush-supporting axles at different locations lengthwise of the conveyor, the brushes at the different regions being substantially symmetrical transversely of the center of support of the articles on the conveyor to avoid forces tending to rotate the articles on the conveyor, said brushes including two brushes at one of said locations and transversely spaced from one another and in position to contact with the outer portions of the glass sheets as they travel along the conveyor, two other brushes at another of said locations further along the conveyor, said other brushes being on opposite sides of the center region and in position to contact with the more inward portions of the sheets as they travel along the conveyor, and a center brush at a location still further along the conveyor in position to contact with the region of each sheet between said more inward portions and at the lowest part of the sheet.

5. The washing apparatus described in claim 4 and in which there is a complementary brush located above each of the other brushes to contact with the opposite side of the sheet so that both sides of each region are scrubbed by the brushes as the glass sheets are advanced through the apparatus by the conveyor.

6. Apparatus for washing curved-glass sheets or the like as they travel along a conveyor with the principal curvature of the sheets about axes that extend in the general direction in which the sheets are moved by the conveyor, means for supplying cleaning liquid to both sides of the sheets, brushes located above and below the sheets and having bristles for scrubbing the surfaces to which the liquid is applied, brush-supporting axles on which the brushes are rotatable about axes extending transversely of the direction of travel of the glass sheets along the conveyor, some of the brush-supporting axles having their axes at different angles to the horizontal and substantially parallel to tangents to the curve of the work piece at the regions operated upon by each of the brushes and said brushes including successive pairs of brushes offset from the transverse middle of the sheets and that contact with different regions of each sheet transversely of the conveyor, each pair of brushes including one that scrubs the top surface and another of which scrubs the bottom surface of the sheet, one of the brushes of each pair being tapered in one direction throughout its length and the opposite brush being tapered in the other direction throughout its length and other brushes that scrub the middle portion of the sheets.

7. Washing apparatus including a conveyor that advances a series of similarly shaped curved articles during a washing operation, a plurality of brushes located along the longitudinal length of the conveyor with successive brushes of limited width and each contacting with only a portion of the width of the articles to be washed transverse of the direction of movement of said articles along the conveyor, the conveyor including successive pairs of endless belts that support the articles, the belts of each pair being spaced from and substantially parallel to one another, the successive pairs of belts being longitudinally spaced from one another along the length of the conveyor by distances less than the longitudinal extent of the articles to be washed and some of the brushes contacting with the articles along but outside of the belts, and other brushes at the location where the successive pairs of belts are longitudinally spaced from one another, said other brushes being in position, transverse of the direction of travel of the articles, to wash the areas of the articles that rest on the conveyor belts.

8. Apparatus for washing bent glass windshields that have a gradually curved center section, wing portions at opposite ends, and intermediate portions connecting the center section with the wing portions, said apparatus comprising a conveyor along which the windshields travel with their axes of curvature extending in substantially the direction of movement of the windshields along the conveyor, and with each windshield oriented so that the convex area of the center section is at the lowest level while the windshield is on the conveyor, a pair of bristle brushes supported by the machine at a station along the path of travel of the windshields and in position to scrub the upper and lower surfaces of one wing portion, and only the wing portion, and corresponding bristle brushes at said station and on the other side of the conveyor in position to scrub the top and bottom surfaces of the wing portion on the opposite end of the windshield, the upper and lower brushes of each pair being tapered in opposite directions.

9. The apparatus described in claim 8, characterized by separate frames supporting each pair of brushes and means for adjusting the frames to change the positions of the brushes for windshields of different curvature.

10. The apparatus described in claim 8, with separate frames supporting each pair of brushes, adjustable supporting means for the frames movable into position to accommodate the brushes to windshields of different curvature, a motor for driving each pair of brushes, the motor for each pair of brushes being carried by the same adjustable frame as the brushes.

11. Apparatus for washing bent glass windshields that have a curved center section, wing portions at opposite ends, and intermediate portions connecting the center section with the wing portions, said apparatus comprising a conveyor supporting the windshields and along which the windshields travel with their axes of curvature extending in substantially the direction of movement of the windshields along the conveyor, means for supplying cleaning liquid to the windshields, a plurality of pairs of bristle brushes located along the path of travel of the windshields, the pairs of brushes being substantially symmetrical transversely of the portion of the conveyor that supports the windshields, bearing means on which the brushes are rotatable about axes extending transversely of the direction of travel of the windshields for scrubbing the upper and lower surfaces of the windshields, each pair of brushes having a width substantially less than the width of the windshields, and the pairs of brushes including one pair for scrubbing one wing, another similar pair at the same location lengthwise of the path of travel and in an opposite transverse position for scrubbing the opposite wing, two other pairs of brushes at substantially the same location lengthwise of the conveyor and in opposite transverse positions with respect to each windshield on which they operate and in position to contact and scrub the respective intermediate sections between the wings and the center section of each windshield, and another pair of brushes in position to scrub the center section of the windshield, at least some of the pairs of brushes being adjustable transversely of the conveyor for shifting the brushes to accommodate windshields of different size and curvature.

12. A machine for washing curved glass sheets or the like, the machine including a conveyor on which the sheets travel through the machine with the principal axes of curvature of the sheets extending in the same general direction as the movement of the sheets along the conveyor, a plurality of pairs of rotary brushes for scrubbing different areas of the transverse width of the sheets, frames by which different pairs of brushes are supported from a main frame of the machine with their axes of rotation of different pairs of brushes extending at different inclinations, to accommodate the brushes to the curvature of the sheets, at least some of the frames being adjustable for sheets of different curvature, power driving means for rotating the brushes, the power driving means including motors located on the same frames with the pairs of brushes which have the greatest inclination to the transverse width of the conveyor, a common driving motor for the other pairs of brushes that have lesser inclination to the transverse width of the conveyor, motion-transmitting connections between the common driving motor and the brushes of said other pairs of brushes, and frames by which at least some of the brushes of said other pairs are carried.

13. The machine described in claim 12 with a rigid main frame and adjustable connections by which the brush-carrying frames are connected to the main frame for shifting certain of said brushes in directions substantially normal to the direction of movement of the articles through the machine.

14. Washing apparatus including a conveyor along which similar articles are advanced during a washing operation, said conveyor including endless belts that are transversely spaced and that have upper runs which support the articles on opposite sides of the center region of each successive article, means that spray washing liquid against the upper and lower surfaces of the articles on the conveyor at stations along the length of the conveyor, pairs of brushes at said stations in position to contact the upper and lower surfaces of the articles as they are advanced by the conveyor, each pair of brushes including upper and lower rotary brushes that contact with the top and bottom surfaces, respectively, of each article, there being a similar pair of brushes equally spaced from the center line of the conveyor in position to operate on limited portions of the articles near the outer ends of the articles, other similar pairs of brushes equally spaced from opposite sides of the center line of the conveyor, but closer together than the first pairs of brushes for operating on intermediate areas of the top and bottom surfaces of the articles, and there being another pair of brushes in position to contact with the center areas of the top and bottom surfaces of the articles along the center line of the conveyor and for equal distances to either side of said center line so that all of the brushes that contact with the article are balanced by corresponding brush contacts on the opposite side of the center line of the conveyor to prevent the brushes from turning the position of the article on the conveyor, and power driving mechanism for each pair of brushes.

15. The washing apparatus described in claim 14, characterized by a gap in the conveyor, the gap being of shorter length than the articles with which the conveyor is intended to be used so that the articles pass across the gap during their travel along the conveyor, and further characterized by the location of brushes in the gap in position to wash the areas of the articles that rest upon the conveyor belts.

16. Apparatus for washing the upper and lower surfaces of curved articles that are advanced through the apparatus with their principal axes of curvature extending in the same general direction as the articles move through the apparatus, said apparatus comprising brushes located at different stations along the path of travel of the articles, each of the brushes having a limited width and contacting with a different range of the transverse width of the article from the ranges covered by the other brushes, axles by which certain of the brushes are supported, said axles extending at different angles to the horizontal to accommodate the brushes to the curvature of the articles, common power driving mechanism for at least some of the axles that are at different angles to the horizontal, and motion transmitting connections between said power driving mechanism and the axles including universal joints for driving some of the angularly related axles.

References Cited in the file of this patent

UNITED STATES PATENTS

| | | |
|---|---|---|
| 2,213,426 | Anderson et al. | Sept. 3, 1940 |
| 2,293,858 | Schafer | Aug. 25, 1942 |
| 2,312,186 | Paddock et al. | Feb. 23, 1943 |
| 2,506,075 | Fleury | May 2, 1950 |
| 2,632,197 | Moss et al. | Mar. 24, 1953 |
| 2,671,926 | Minerley | Mar. 16, 1954 |

FOREIGN PATENTS

| | | |
|---|---|---|
| 403,970 | Germany | Oct. 9, 1924 |